Figure 1:
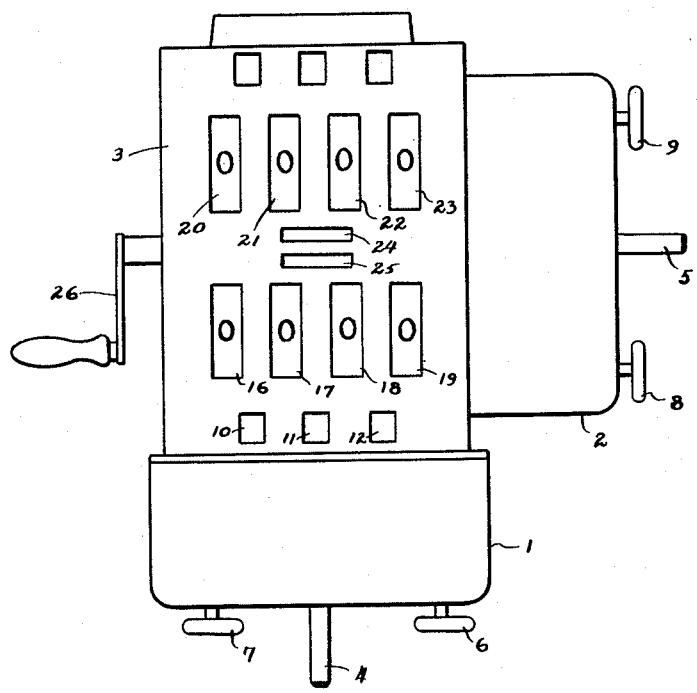

May 27, 1958 W. HAUPT 2,836,361
COMPUTING AND INDICATING MECHANISM
FOR FLUID METERING DEVICES
Filed Dec. 19, 1952 2 Sheets-Sheet 1

INVENTOR.
WILHELM HAUPT
BY
Mestern & Kollin,
ATTORNEYS

May 27, 1958
W. HAUPT
2,836,361
COMPUTING AND INDICATING MECHANISM
FOR FLUID METERING DEVICES
Filed Dec. 19, 1952
2 Sheets-Sheet 2
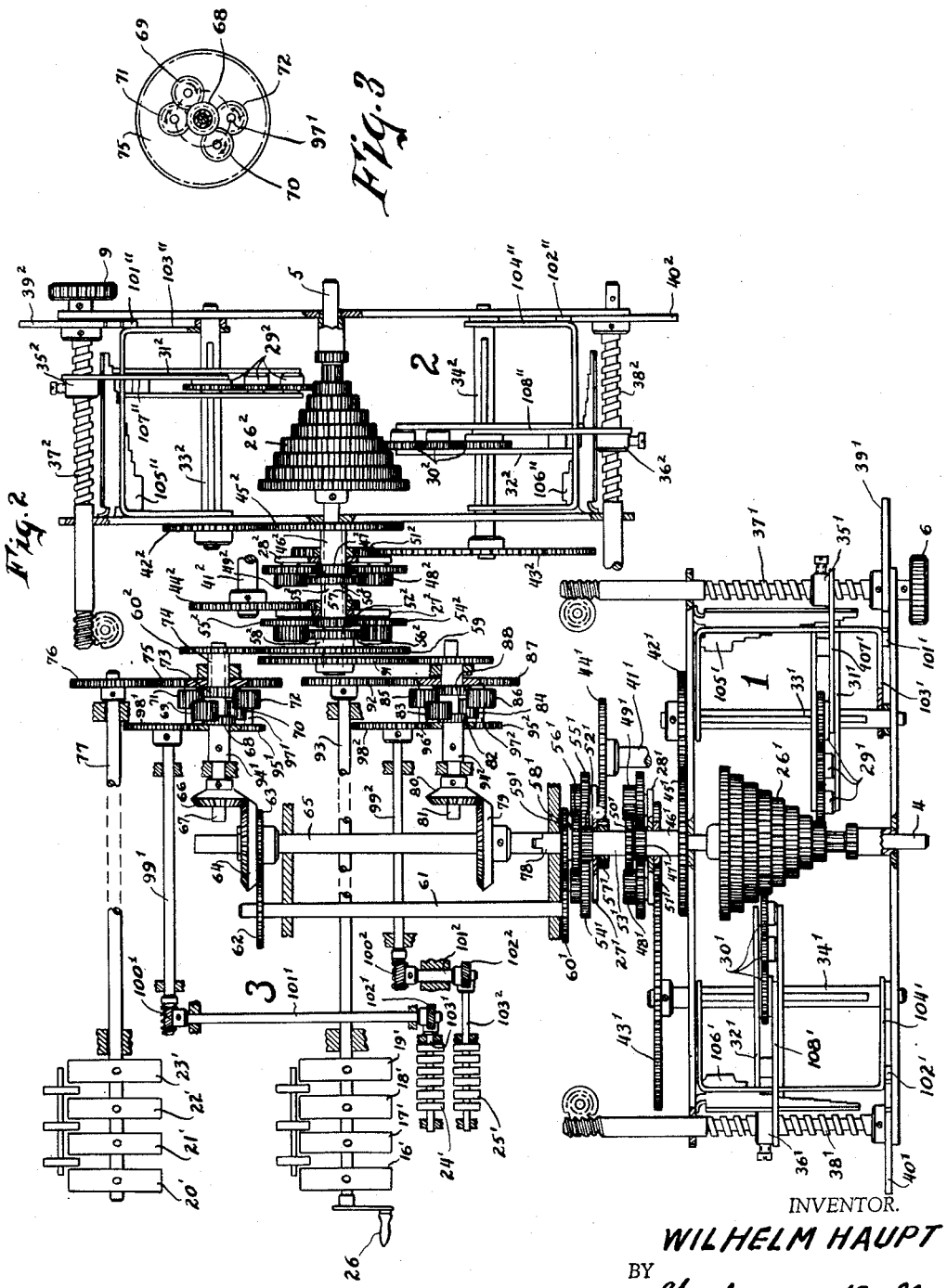
INVENTOR.
WILHELM HAUPT
BY
Mestern & Kollin
ATTORNEYS

United States Patent Office 2,836,361
Patented May 27, 1958

2,836,361

COMPUTING AND INDICATING MECHANISM FOR FLUID METERING DEVICES

Wilhelm Haupt, Villingen, Schwarzwald, Germany, assignor to Kienzle Apparate G. m. b. H., Villingen, Germany Application December 19, 1952, Serial No. 326,955

Claims priority, application Germany December 21, 1951

3 Claims. (Cl. 235—94)

The invention relates to a computing and indicating mechanism for fluid metering devices, particularly for filling-station pumps. Such pumps are generally of such design as to dispense only a single kind of fuel, as gasoline, benzene or the like, the amounts of liquid withdrawn being computed and indicated in terms of volume and price by means of a computing and indicating mechanism.

The invention relates in particular to a computing and indicating mechanism for filling-station pumps which can dispense various fuel or fuel-and-oil mixtures. Such pumps are generally equipped with indicating mechanisms which severally compute and indicate the volumes of the components of the fuel or fuel-and-oil mixtures.

One of the objects of the invention is to improve computing and indicating mechanisms for mixture pumps so as to permit overall computation and indication of the volumes and prices of the liquid mixtures withdrawn.

Another object of the invention is to provide computing and indicating mechanisms such that the liquids withdrawn are both severally and jointly computed and indicated in terms of volume and price.

A further object of the invention is to provide computing and indicating mechanisms such that when single liquids or mixtures of liquids are withdrawn, no manual control or adjustment is required, and that the respective liquids withdrawn, whether single liquids or mixtures of liquids, are correctly and automatically computed and indicated in terms of volume and price.

Still another object of the invention is to provide such computing and indicating mechanisms with an additional computing and indicating device serving to add and indicate the total liquids withdrawn cumulatively, for checking purposes.

The invention will be exemplified and described with reference to the accompanying drawings, wherein Fig. 1 shows a front view of a computing and indicating unit according to the invention, in a closed casing, and Fig. 2 shows the arrangement of the gearing in the said computing and indicating mechanism.

Fig. 3 is an end view of a detail of Fig. 2.

As shown in Fig. 1, the device according to the invention comprises two computing units 1 and 2, attached to the bottom and to one side, respectively, of an indicating unit 3. While computing unit 1 is driven by a shaft 4 connected to the meter for one liquid, computing unit 2 is driven by a shaft 5 connected by transmission means to the meter for another liquid. The meters themselves, and the transmissions connecting them to the shafts driving the computing units, are not shown, since these parts are not included in the scope of the invention and are generally known to those skilled in the art.

The computing units are provided with adjusting knobs 6 and 7 for unit 1 and adjusting knobs 8 and 9 for unit 2, which knobs serve to adjust the unit so as to indicate the current prices per unit volme of liquid. The number of knobs required depends on the system of currency involved, as dollars and cents, pounds, shillings and pence, etc. The indicated prices per unit volume of liquid appear in windows 10, 11, and 12 for computing unit 1, and in windows 13, 14 and 15 for computing unit 2. Windows 16, 17, 18 and 19 serve to indicate the total volumes of liquid withdrawn as computed by the two computing units 1 and 2, while windows 20, 21, 22, and 23 serve to indicate the total prices of the liquids withdrawn as computed by the computing units 1 and 2. As will appear from the following description, it makes no difference whether one liquid only, or the other liquid only, or an arbitrary mixture of both liquids, is withdrawn. Window 24 cumulatively indicates the total volume of liquid withdrawn from the pump, while window 25 cumulatively shows the total price of the volumes of liquid dispensed. The crank 26 serves for the zero setting of the registers 16 to 19 and 20 to 23 after each dispensation of fluids.

In the following description, corresponding parts of the two computing units 1 and 2, which units are of identical design, will be referred to by the same reference numbers with the addition of superscripts 1 and 2, where the superscript 1 refers to computing unit 1 and the superscript 2 to computing unit 2.

The two computing units 1 and 2 comprise the following principal parts:

Shafts 4 and 5 respectively bear a step gear $26^1$ or $26^2$, as well as two differential gears $27^1$, $28^1$ or $27^2$, $28^2$. The step gears $26^1$ and $26^2$ are in engagement with several gear trains, usually three, of which for simplicity only the two gear trains $29^1$, $29^2$ and $30^1$, $30^2$ are shown. These gear trains are each mounted in a rocker $31^1$, $31^2$ and $32^1$, $32^2$, axially displaceable on shafts $33^1$, $33^2$, $34^1$, $34^2$, so that the end gears of trains $29^1$, $29^2$, and $30^1$, $30^2$ are non-rotatably but displaceably connected to these shafts. The rockers $31^1$, $31^2$ and $32^1$, $32^2$ are laterally displaceable by means of slide nuts $35^1$, $35^2$ and $36^1$, $36^2$ mounted on helically grooved shafts $37^1$, $37^2$ and $38^1$, $38^2$ which can be rotated by means of the aforesaid knobs 6, 7, 8 and 9 for purposes of entering the applicable prices per unit volume of liquid. During this adjustment, cams $39^1$, $39^2$ and $40^1$, $40^2$ swing the rockers $31^1$, $31^2$ or $32^1$, $32^2$ in such a manner that the gears of trains $29^1$, $29^2$ and $30^1$, $30^2$ that engage the step gears $26^1$ and $26^2$ go out of engagement at the beginning of the adjustment and into engagement upon completion of the adjustment, with the said step gears $26^1$ and $26^2$. For this purpose, cams $39^1$, $39^2$, $40^1$ and $40^2$ are curved and provided with pins $101^1$, $101^2$, $102^1$, $102^2$ engaging with rocking brackets $103^1$, $103^2$, $104^1$, $104^2$; upon each rotation, the brackets are rocked from a position of rest into a different position. These brackets are in engagement with the above mentioned rockers $31^1$, $31^2$, $32^1$, and $32^2$ mounted rotatably on shafts $33^1$, $33^2$, $34^1$ and $34^2$. The rockers support on their forward ends gear trains $29^1$, $29^2$, $30^1$ and $30^2$ and with their rear ends are guided in slots (not shown) of brackets $103^1$, $103^2$, $104^1$, $104^2$ and capable of abutting on 9 steps of stepped sheets $105^1$, $105^2$, $106^1$, and $106^2$. The rockers are connected to bars $107^1$, $107^2$, $108^1$ and $108^2$ which in turn are secured to the slide nuts $35^1$, $35^2$, $36^1$ and $36^2$.

As a consequence, by actuating knobs 6, 7, 8 and 9, gear trains $29^1$, $29^2$, $30^1$ and $30^2$ are swung away from the step gears $26^1$ and $26^2$ by way of cams $39^1$, $39^2$, $40^1$ and $40^2$, brackets $103^1$, $103^2$, $104^1$ and $104^2$, and rockers $31^1$, $31^2$, $32^1$ and $32^2$; thereupon gear trains $29^1$, $29^2$, $30^1$ and $30^2$ are laterally shifted by means of sliding nuts $35^1$, $35^2$, $36^1$ and $36^2$ and bars $107^1$, $107^2$, $108^1$ and $108^2$ until they come into engagement with the gears of step gears corresponding to the price per liter to be newly adjusted.

Since, depending on the adjustment of the knobs 6, 7, 8 and 9, the gear trains $29^1$, $29^2$ and $30^1$ $30^2$ are in engagement with various steps of the step gears $26^1$ and $26^2$, the shafts $33^1$, $33^2$ and $34^1$, $34^2$ are driven at various speeds. The same applies to the corresponding third shafts $41^1$, $42^2$ belonging to the third price-entering systems not shown. The shafts $33^1$, $33^2$ $34^1$, $34^2$ and $41^1$, $41^2$, then, bear fixedly attached gears $42^1$, $42^2$, $43^1$, $43^2$ and $44^1$, $44^2$ which transmit their rotations to the differential gears $27^1$, $28^1$ and $27^2$, $28^2$. This is accomplished as follows: The gears $42^1$ and $42^2$ are in engagement with gears $45^1$ and $45^2$ connected by sleeves $46^1$ and $46^2$ rotatably mounted on shafts 4 and 5 to the sun gears $47^1$ and $47^2$ of the differentials $28^1$ and $28^2$. The sun gears $47^1$ and $47^2$, via two planetary gears $48^1$, $48^2$ and $49^1$, $49^2$, are in engagement with another sun gear $50^1$, $50^2$. The planetary gears $48^1$, $48^2$ and $49^1$, $49^2$ are driven via gears $51^1$, $51^2$ by gears $43^1$ and $43^2$. Consequently, in the differentials $28^1$ and $28^2$, the rotations of gears $42^1$, $43^1$ or $42^2$, $43^2$, respectively, are added. The sum of these rotations is the rotation of the sun gear $50^1$, $50^2$, in transmission with the sun gears $52^1$, $52^2$ of the differentials $27^1$, $27^2$ via sleeves $53^1$, $53^2$. These differentials $27^1$, $27^2$ in turn have planetary gears $54^1$, $54^2$ and $55^1$, $55^2$ which are in transmission with a final sun gear $56^1$, $56^2$. Since the planetary gears $54^1$, $55^1$, and $54^2$, $55^2$, respectively, are simultaneously driven by gears $44^1$ and $44^2$ and by gears $57^1$ and $57^2$ mounted on the sleeves $53^1$ and $53^2$, the differentials $27^1$ and $27^2$ add the rotations of gears $44^1$ and $44^2$ to those of sun gears $50^1$, $50^2$, and $52^1$, $52^2$ and transmit the result to the sun gears $56^1$ and $56^2$.

According to the invention, then, in the computing and indicating mechanism 3, the metered quantities transmitted for the two liquids by the shafts 4 and 5, and the separate prices for the two liquids as measured by the sun gears $56^1$ and $56^2$, are suitably combined, so that, in accordance with the objects of the invention, the total value of the liquid volumes, or their individual values if only one liquid is withdrawn, together with their prices, are computed and indicated. This is accomplished in the following manner:

First consider the addition of the prices. The sun gears $56^1$ and $56^2$ are fixed upon sleeves $58^1$ and $58^2$ fixedly connected to gears $59^1$ and $59^2$, which in turn are in engagement with gears $60^1$ and $60^2$. The gear $60^1$ is fixedly mounted on a shaft 61 bearing another gear 62 at the other end. This gear in turn is in engagement with a gear 63 which, together with a bevel gear 64 fixedly attached to it, is freely rotatable on a shaft 65. The bevel gear 64, via another bevel gear 66 fixedly connected to a shaft 67, drives the sun gear 68, fixedly connected to the said shaft, of a planetary system having planetary gears 69 and 70, as well as additional planetary gears 71 and 72 and another sun gear 73 fixedly connected to the gear $60^2$ via a sleeve 74. Thus the planetary system described adds the values of the prices of the individual liquids as transmitted from the computing units 1 and 2. The sum is indicated as follows: A gear 75, fixedly connected to planetary gears 69, 70, 71 and 72 via their shafts 76, is in transmission with another gear 76. The latter gear is fixedly connected to a shaft 77 acting upon the price-indicating counter discs 20', 21', 22' and 23' visible through windows 20, 21, 22 and 23. The counter discs, for greater clarity, have been shown over to the left of their actual position. The counter can be set to zero and is driven by a known mechanism not shown. Its true position is at about top center of the gearing layout.

Next consider the addition of the liquid volumes. The end of shaft 4 is connected via a clutch 78 to the aforesaid shaft 65, which bears a bevel gear 79. The latter is in engagement with another bevel gear 80 fixedly mounted on a shaft 81, through which it drives a sun gear 82 of a planetary system serving to add the individual volumes. This system comprises two sets of planetary gears 83, 84 and 85, 86 which are connected by their shafts to a gear 87, the former pair of planetary gears being in transmission with the sun gear 82 and the latter pair with a sun gear 88. The latter sun gear 88, via a sleeve 89, is connected with a gear 90 driven by a gear 91 fixedly connected to the shaft 5. Thus, the planetary system described adds the rotations of shafts 4 and 5 and therefore the individual volumes of the two liquids withdrawn. The sum for both liquids is indicated as follows: The gear 87, fixedly connected to the planetary gears, is in engagement with another gear 92 fixedly attached to a shaft 93. The latter leads to the volume indicator discs 16', 17', 18' and 19', adjustable to zero, that are visible through windows 16, 17, 18 and 19.

Further, the volumes and prices of the liquids withdrawn from the station are to be cumulatively added and indicated in windows 24 and 25, for checking purposes. This is accomplished by means of two identical gearings respectively in engagement with the volume and price differentials. Again, like parts will be designated by the same reference numbers, parts of the price mechanism being distinguished by the superscript 1 and parts of the volume mechanism by the superscript 2.

Shafts 67 and 81, respectively, bear fixed sleeves $94^1$ and $94^2$ upon which gears $95^1$, $95^2$ are rotatably mounted. While gear $95^1$, via shafts $96^1$, $97^1$ of the planetary gears, is connected to the gear 75 of the price differential, gear $95^2$ is fixedly connected via shafts $96^2$, $97^2$ with the gear 87 of the volume differential. Gears $95^1$ and $95^2$ engage gears $98^1$ and $98^2$, fixedly mounted on transverse shafts $99^1$, $99^2$. The latter, by means of worm gears $100^1$, $100^2$, drive shafts $101^1$, $101^2$, which, by means of additional worm gears $102^1$, $102^2$, drive the shafts $103^1$, $103^2$ of counters 24', 25', visible in windows 24 and 25, respectively serving for cumulative addition of the prices and for cumulative addition of the volumes of the liquids dispensed.

What I claim is:

1. A computing and indicating device for the dispensing of one or several types of metered fluids, particularly for filling station pumps, which indicates the total volume dispensed and the price therefor, comprising at least two input shafts, each input shaft being rotated through an angle indicative of the amount of one type of metered fluid, at least two computers, each input shaft being connected to one of said computers, at least two price setting registers, each of said registers being adapted to be set for different unit prices and connected to one of said computers, two totalizing mechanisms, the first of said totalizing mechanisms being connected to said input shafts, the second of said totalizing mechanisms being connected to said computers, and two indicators connected to said two totalizing mechanisms, respectively.

2. A computing and indicating device for the dispensing of one or several types of metered fluids, particularly for filling station pumps, which indicates the total volume dispensed and the price therefor, comprising two input shafts, each input shaft being rotated through an angle indicative of the amount of one type of metered fluid, two computers, each input shaft being connected to one of said computers, two price setting registers, each of said registers being adapted to be set for different unit prices and connected to one of said computers, two totalizing mechanisms, each having two sun gears and at least one pair of meshing planetary gears, said planetary gears in each of said totalizing mechanisms being arranged parallel to said sun gears and each meshing with one of said sun gears, each of said planetary gears being supported to roll on the circumference of its meshing sun gear, said sun gears of said first totalizing mechanism being connected to said input shafts, respectively, said sun gears of said second totalizing mechanism being connected to said computers, respectively, and two indicators, one of said indicators being connected to at least one planetary gear of one totalizing mechanism, the other of said indicators being connected to at least one planetary gear of the other of said totalizing mechanisms.

3. A computing and indicating device as claimed in claim 2, in which the two sun gears of each totalizing mechanism are axially aligned and each of said totalizing mechanisms comprises two pairs of planetary gears, one planetary gear of each pair meshing with one of said sun gears, the other planetary gear of the same meshing with the other of said sun gears, the two planetary gears of each pair mutually meshing, four shafts, each of said planetary gears rotatably mounted on one of said shafts, two auxiliary gears rotatable on the common axis of said sun gears, one end of each of said four shafts being rigidly connected to one of said auxiliary gears, the other end of each of said four shafts being rigidly connected to the other of said auxiliary gears, two indicators with zero setting, one of said auxiliary gears in each totalizing mechanism being operatively connected to one of said indicators with zero setting, and two progressively advancing indicators, the other of said auxiliary gears in each totalizing mechanism being operatively connected to one of said progressively advancing indicators.

References Cited in the file of this patent

UNITED STATES PATENTS

| | | |
|---|---|---|
| 1,600,513 | Royer | Sept. 21, 1926 |
| 2,111,996 | Slye | Mar. 22, 1938 |

FOREIGN PATENTS

| | | |
|---|---|---|
| 368,149 | Great Britain | Mar. 3, 1932 |